(12) United States Patent
Brauer (10) Patent No.: US 6,822,812 B1
(45) Date of Patent: Nov. 23, 2004

(54) OFF-ANGLE DISPLAY SYSTEMS AND ASSOCIATED METHODS OF MANUFACTURE AND USE

(75) Inventor: Robert Klaus Brauer, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/461,155

(22) Filed: Jun. 12, 2003

(51) Int. Cl.$^7$ ............................ G02B 3/08; A47C 31/00
(52) U.S. Cl. ...................... 359/742; 359/741; 359/743; 297/217.3
(58) Field of Search .............................. 359/742, 741, 359/743, 629, 630, 632, 619; 297/217.3

(56) References Cited

U.S. PATENT DOCUMENTS 4,521,078 A * 6/1985 Baeger .......................... 349/96
4,788,588 A * 11/1988 Tomita ......................... 348/602

OTHER PUBLICATIONS

Brauer, Klaus, "Nice Touches Comfort Standards for Economy–Class Seating," Aircraft Interiors EXPO 2003, Hamburg, Germany, Feb. 26, 2003 (11 pages).

Brauer, Klaus, "Death by a Thousand Nice Touches," Aircraft Interiors EXPO 2001, Cannes, France, Feb. 27, 2001 (14 pages).

Fresnel Lenses (4 pages) http:://www.gunn.palo–alto.ca.us/~cbakken/p1A/optics/obookshelf/fresnel.html [Accessed Mar. 25, 2003].

* cited by examiner

Primary Examiner—Tim Thompson
(74) Attorney, Agent, or Firm—Perkins Coie LLP (57) ABSTRACT

Visual display systems that can accommodate off-angle viewing. In one embodiment, a visual display system includes a visual display device, such as a video display device, having a display screen configured to display visual images. The display screen can at least generally face a first direction that is angled relative to a viewing direction. The visual display system can further include an optical tilting device at least generally overlaying the display screen. The optical tilting device can include a refracting lens, such as a Fresnel lens or other device, configured to optically tilt the displayed images toward the viewing direction to facilitate viewing of the displayed images. In another embodiment, the visual display device can be carried by a seatback portion of a passenger seat.

55 Claims, 5 Drawing Sheets

OFF-ANGLE DISPLAY SYSTEMS AND ASSOCIATED METHODS OF MANUFACTURE AND USE

TECHNICAL FIELD

The following disclosure relates generally to systems for displaying visual images and, more particularly, to systems for displaying visual images to passengers in aircraft and other vehicles.

BACKGROUND

Many transport aircraft include video screens that allow passengers to view movies, newscasts, and other content during flight. Some of these screens are centrally located above an aisle or other location for viewing by a group of passengers. Others are mounted to seatbacks for viewing by individual passengers seated directly behind the screens. Providing such passengers with individual screens allows them to personally select the video content they wish to view during flight. This option can make the flight more enjoyable for such passengers, especially if it is a long flight.

Seatback video screens are typically mounted approximately eight inches below eye level of the viewing passenger. This offset can result in a downward viewing angle of approximately 20 degrees. This downward angle can increase to as much as 34 degrees if the seat to which the screen is mounted is fully reclined. To correct the viewing angle, seatback video screens are often mounted in housings and configured to pivot about a horizontal axis within the housing so that they can be directed upwardly toward the viewing passenger.

The housings of conventional seatback video screens are often relatively deep to accommodate the full range of screen movement. For example, while the video screens themselves are typically less than one inch thick, the housings often measure from 3 to 4 inches deep. As a result, the seatbacks in which these housings are mounted can be up to 3 inches thicker than would otherwise be required to accommodate fixed (i.e., non-pivoting) video screens. This increase in seatback thickness represents a 10–15% reduction in space between the passenger and the back of the seat in front of him or her. This loss of space can impede passenger movement into and out of the seat. In addition, this loss of space can make using a laptop computer or eating from a fold-down tray table somewhat awkward, particularly when the seat to which the tray table is mounted is fully reclined.

The interior surfaces of aircraft passenger cabins generally flow fore and aft, parallel to the normal viewing perspective of passengers. Such interior surfaces can include, for example, the bottom surfaces of overhead luggage bins. Because of the orientation of these surfaces, video screens mounted flush to them may be somewhat difficult for passengers to view. To overcome this problem, video screens have been mounted on these surfaces with mechanical means that allow the video screens to pivot downwardly to a position more suitable for viewing. In addition to adding mechanical complexity and weight, this pivoting feature can also create a head strike concern when the video screen is in the lowered position. As a result, use of these video screens is generally not allowed during takeoff and landing. Unfortunately, viewing landscape camera images during these phases of flight is often popular among passengers. A further shortcoming associated with such video screens is that they tend to obstruct the visual flow of the interior architecture when rotated down into the viewing position.

SUMMARY

Aspects of the invention are directed to visual display systems that can accommodate off-angle viewing. In one embodiment, a visual display system includes a visual display device having a display screen configured to display visual images. The display screen can at least generally face a first direction. The visual display system can further include an optical tilting device at least generally overlaying the display screen. The optical tilting device can be configured to optically tilt the visual images on the display screen away from the first direction toward a second direction to facilitate viewing of the visual images in the second direction. In one aspect of this embodiment, the optical tilting device can include a refracting lens, such as a Fresnel lens. In another embodiment, the optical tilting device can include a Fresnel prism.

In a further embodiment, the visual display system can also include an image distorter operatively connected to the visual display device. The image distorter can be configured to electronically distort the visual images on the display screen to compensate for optical distortion resulting from the angle of the display screen relative to the viewer.

In yet another embodiment, a method of manufacturing a display system includes providing a visual display device having a display screen configured to display visual images. The display screen can at least generally face a first direction. The method can further include overlaying the display screen with an optical tilting device configured to optically tilt the visual images on the display screen toward a second direction that is angled relative to the first direction. In one aspect of this embodiment, the display screen can be mounted to a portion of a passenger seating area in a vehicle to accommodate off-angle viewing by one or more passengers in the second direction.

DETAILED DESCRIPTION

The following disclosure describes visual display systems that can accommodate off-angle viewing. Several embodiments of visual display systems configured in accordance with the present invention can provide off-angle viewing for passengers in aircraft, cars, buses, trains and other vehicles. Certain specific details are set forth in the following description and in FIGS. 1–8 to provide a thorough understanding of various embodiments of the invention. Other details describing well-known structures and systems often associated with display systems, and more specifically, with video display systems, are not set forth, however, to avoid unnecessarily obscuring the description of the various embodiments of the invention.

Dimensions, angles, and other specifications shown in the Figures are merely illustrative of particular embodiments of the invention. Accordingly, other embodiments can have other dimensions, angles, and specifications without departing from the spirit or scope of the present invention. In addition, those of ordinary skill in the relevant art will appreciate that other embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
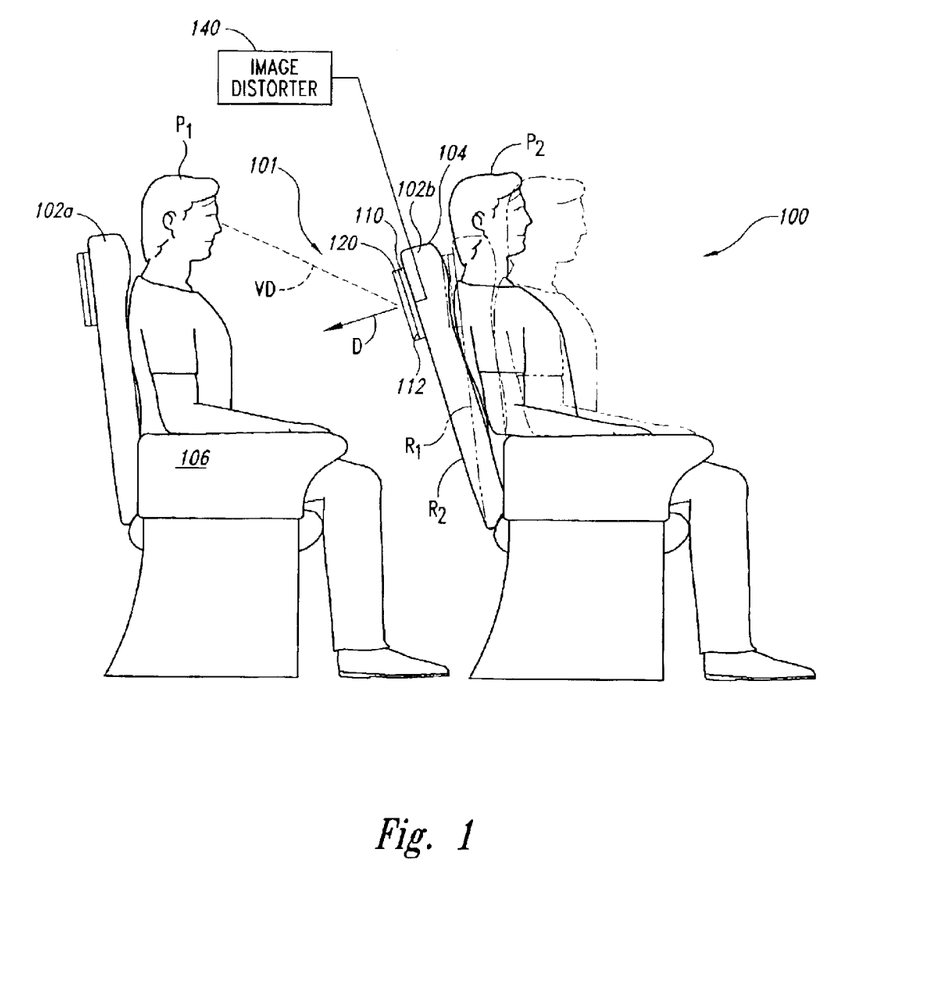
FIG. 1 is a partially schematic side elevation view of a passenger seating area having an off-angle display system configured in accordance with an embodiment of the invention.

FIG. 1 is a partially schematic side elevation view of a passenger seating area 100 having an off-angle display system 101 configured in accordance with an embodiment of the invention. Aspects of the passenger seating area 100 can be at least generally similar to aspects of passenger seating compartments typically found in aircraft, cars, buses, trains and other vehicles. Accordingly, the passenger seating area 100 can include one or more passenger seats 102 (shown as a first seat 102a and a second seat 102b) positioned in rows to accommodate passengers P (shown as a first passenger $P_1$ and a second passenger $P_2$). In the illustrated embodiment, each passenger seat 102 includes a seatback portion 104 that is movable between at least a first reclined position $R_1$ (shown in phantom line in FIG. 1) and a second reclined position $R_2$. In other embodiments, the seatback portion 104 can be at least generally fixed in an upright or semi-reclined position without departing from the present invention.

In one aspect of this embodiment, the off-angle display system 101 includes a visual display device 110 carried by the seatback portion 104. The visual display device 110 can include a display screen 112 at least generally facing a first direction D that is angled downward relative to a viewing direction VD of the passenger $P_1$. The display screen 112 can be configured to display visual images for viewing by the passenger $P_1$. Such visual images can include movies, newscasts, on-line content, and other forms of visual content. The visual display device 110 can be at least generally similar in structure and function to one or more well-known visual display devices. Such devices can include video, television, computer and other commercially available display devices having cathode ray tube (CRT), liquid crystal display (LCD), or laser emitting diode (LED) display screens.

In another aspect of this embodiment, the off-angle display system 101 includes an optical tilting device 120 at least generally overlaying the display screen 112. In one embodiment, the optical tilting device 120 can include a refracting lens, such as a Fresnel lens or similar device, for optically tilting the visual images on the display screen 112 upward toward the viewing direction VD. In another embodiment, the optical tilting device 120 can include a Fresnel prism. In a further embodiment, the optical tilting device 120 can include a segment from a convex Fresnel lens having concentric lens ridges. To enhance picture quality in this further embodiment, the focal length of the convex Fresnel lens can be at least approximately equal to the distance between the optical tilting device 120 and the eyes of the passenger $P_1$. In other embodiments, it is expected that the optical tilting device 120 can include other devices suitable for optically tilting visual images.

One feature of aspects of the invention illustrated in FIG. 1 is that the off-angle display system 101 optically tilts the display screen 112 so that mechanical tilting features are not required to provide the passenger $P_1$ with a favorable viewing angle. Without these mechanical tilting features, the display system 101 can be made relatively thin so that it does not appreciably increase the thickness of the seatback portion 104. One advantage of this feature is that it provides the passenger $P_1$ with additional space between the passenger seats 102. The additional space not only makes for a more comfortable trip, but it also allows for easier movement into and out of the passenger seats 102. In addition, this space provides more room for use of a laptop computer or for eating from a fold-down tray table (not shown).

When the seatback portion 104 moves from the first reclined position $R_1$ to the second reclined position $R_2$, the viewing angle increases and the visual images displayed on the display screen 112 will be increasingly distorted if viewed from the perspective of the passenger $P_1$. More specifically, when viewed by the passenger $P_1$, the visual images optically foreshorten and become wider toward the top of the display device 110 as the seatback portion 104 assumes greater recline angles. Another aspect of this embodiment can compensate or correct for this optical distortion by including an image distorter 140 (shown schematically in FIG. 1) operatively connected to the visual display device 110. As explained in greater detail below with reference to FIGS. 2A–4C, the image distorter 140 can be configured to electronically distort or "keystone" the visual images to compensate for the optical distortion caused by the angle of the seatback portion 104. As used throughout this disclosure, the terms "keystoning" and "electronic distortion" are used to refer to electronically distorting the shape of a visual image on a display screen. Such distortion can include vertically elongating the visual image and/or horizontally compressing a portion of the visual image. For example, in one embodiment, such distortion can include vertically elongating the visual image and horizontally compressing an upper portion of the visual image. This electronic distortion can be directly opposite to the optical distortion that results from inclining a visual image relative to a viewer. This optical distortion can create, in the instance of a rectangular of square display screen, a visual image that is foreshortened along a vertical axis and expanded horizontally toward an upper portion of the screen to provide a trapezoidal shape where the two sides angle outwardly from each other as they move up, and the top and bottom edges remain parallel.

Figure 2A:
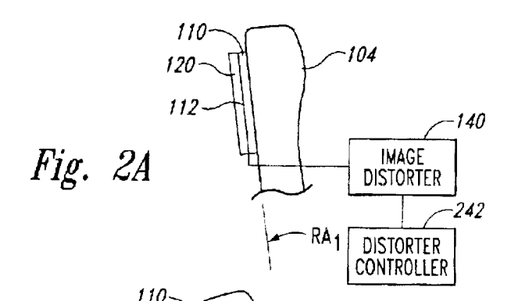
FIGS. 2A–2C are partially schematic enlarged side views of a seatback portion of FIG. 1 shown in various angles of recline in accordance with an embodiment of the invention.
Figure 2B:
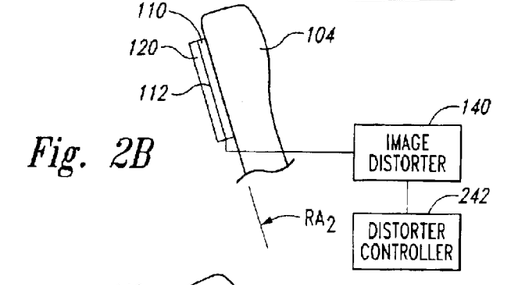
Figure 2C:
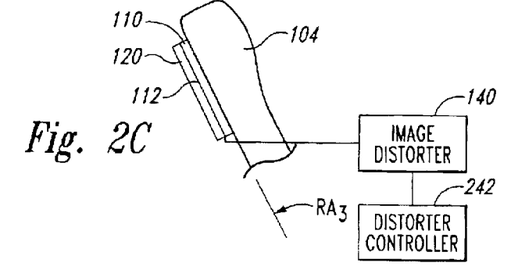
Figure 3A:
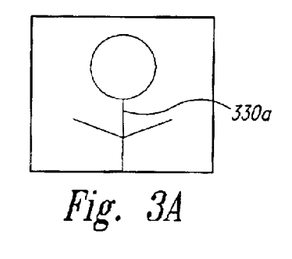
FIGS. 3A–3C are front views of a visual image displayed on the seatback portion of FIGS. 2A–2C without electronic image distortion to compensate for recline angle.
Figure 3B:
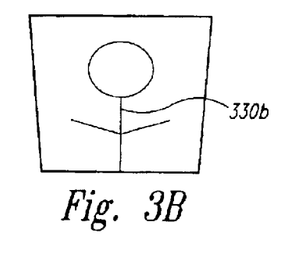
Figure 3C:
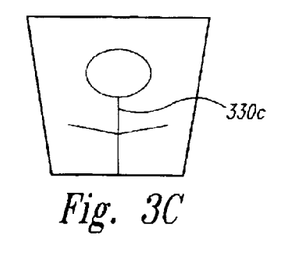
Figure 4A:
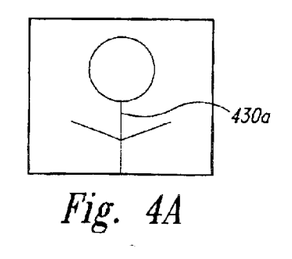
FIGS. 4A–4C are front views of a visual image displayed on the seatback portion of FIGS. 2A–2C with electronic image distortion to compensate for recline angle in accordance with an embodiment of the invention.
Figure 4B:
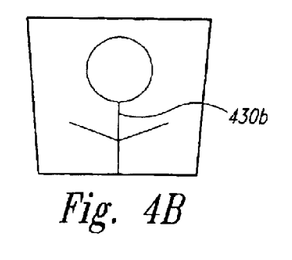
Figure 4C:
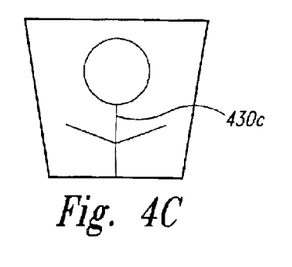

FIGS. 2A–2C are partially schematic enlarged side views of the seatback portion 104 of FIG. 1 in various angles of recline RA (shown as angles $RA_1$, $RA_2$ and $RA_3$) in accordance with embodiments of the invention. FIGS. 3A–3C are corresponding front views of a visual image 330 displayed on the display screen 112 without any electronic image distortion to compensate for the optical distortion caused by the increased recline angle. FIGS. 4A–4C are corresponding front views of a visual image 430 that is similar to the visual image 330, except that the visual image 430 has been electronically distorted or keystoned in accordance with an embodiment of the invention to compensate for the optical distortion caused by the recline angle and/or the viewing angle. Beginning with FIG. 2A, the seatback portion 104 is nearly upright at a first recline angle $RA_1$. As shown in corresponding FIG. 3A, the first recline angle $RA_1$ causes relatively little optical distortion of the visual image 330a from the viewing perspective of the passenger (not shown). Accordingly, as shown in FIG. 4A, the image distorter 140 keystones the visual image 430a relatively little, if at all, to compensate for this optical distortion.

Referring next to FIG. 2B, the seatback portion 104 has been moved to a second recline angle $RA_2$ that is greater than the first recline angle $RA_1$. As shown in corresponding FIG. 3B, this recline angle causes the visual image 330b to become slightly foreshortened and slightly wider toward the top when viewed from the perspective of the passenger. As shown in FIG. 4B, the image distorter 140 can compensate for this optical distortion by keystoning the visual image 430b. Specifically, the image distorter 140 can elongate the visual image 430b to compensate for the slight foreshortening and can compress the top portion of the visual image 430b to compensate for the slight widening of the top portion. As a result of this keystoning, the visual image 430b appears at least generally proportionally accurate to the viewing passenger.

In yet another aspect of this embodiment, the off-angle display system 101 (FIG. 1) can further include a distorter controller 242 (shown schematically in FIGS. 2A–2C) operatively connected to the image distorter 140. In one embodiment, the controller 242 can include a user interface that is accessible to the viewing passenger and allows the passenger to manually adjust the electronic image distortion to suit his or her particular viewing angle. For example, in one embodiment, this user interface can include an adjustment knob positioned at least proximate to the display screen 112. In another embodiment, the user interface can include a knob or similar device positioned on an armrest 106 of the passenger seat 102 (FIG. 1).

In another embodiment, the controller 242 can automatically control the image distorter 140 in response to angular changes of the visual display device 110. For example, in one embodiment, the controller 242 can include an inclinometer or other device for automatically determining the angle of inclination of the display screen 112 relative to the viewing direction VD of the passenger $P_1$ (FIG. 1). The controller 242 can output a signal to the image distorter 140 that causes the image distorter 140 to electronically distort the visual images as required to compensate for the determined angle of inclination. In a further embodiment, the controller 242 can be operatively connected to a seat reclining mechanism (not shown) for determining the angle of inclination of the seatback portion 104 and, accordingly, the display screen 112. As will be appreciated by those of ordinary skill in the relevant art, a number of other devices can be used to determine the angle of inclination of the display screen 112 for automatically controlling the electronic distortion of the visual images displayed on the screen.

Referring next to FIG. 2C, the seatback portion 104 is now fully reclined to a third recline angle $RA_3$. As shown in corresponding FIG. 3C, the visual image 330c is now very foreshortened and very widened near the top. As shown in FIG. 4C, however, the image distorter 140 can keystone the visual image 330c into the visual image 430c that more accurately reflects the proper proportions of the image. As will be appreciated by reference to FIGS. 4A–4C, the image distorter 140 of the present invention allows viewers to enjoy visual images of at least generally constant proportions regardless of the recline angle of the seatback portion 104 to which the visual display device 110 is mounted.

Figure 5:
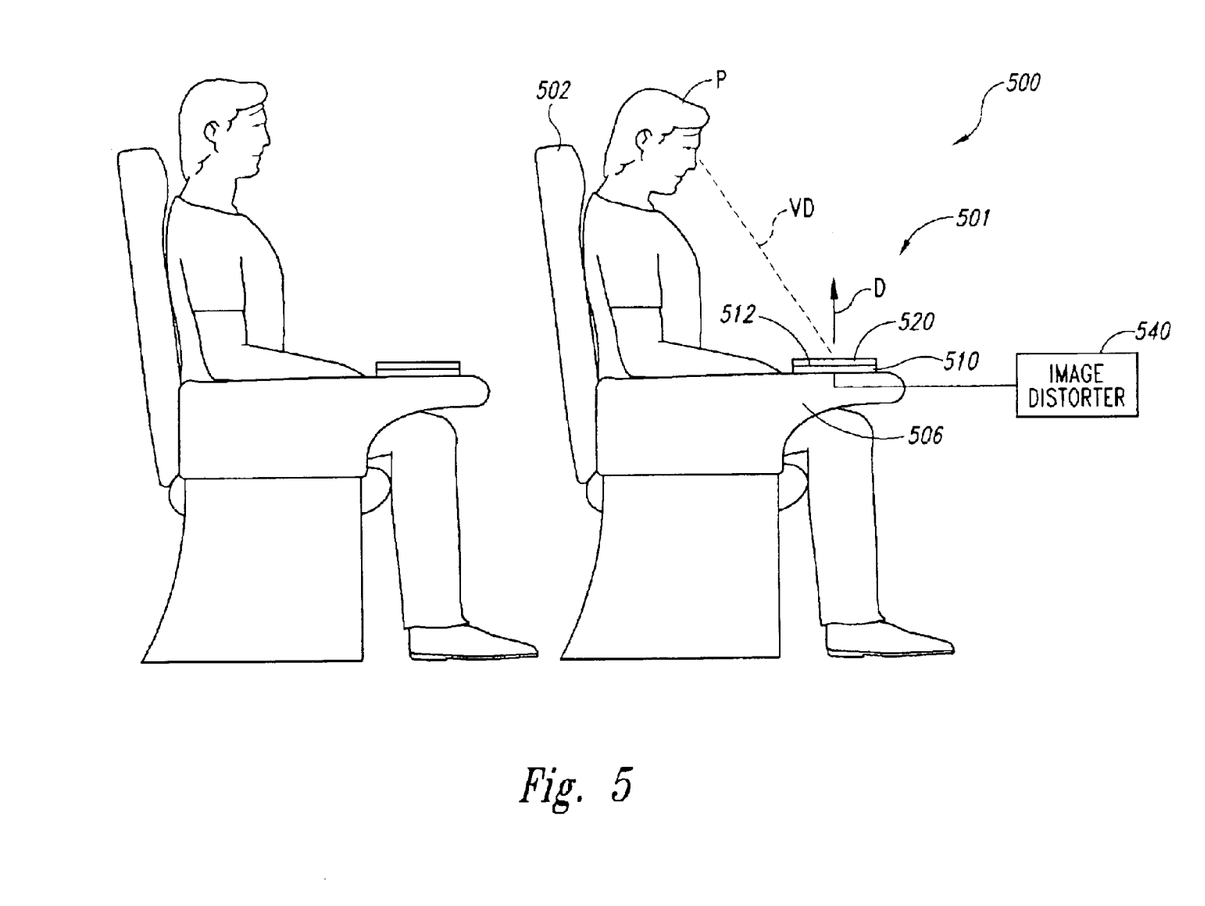
FIG. 5 is a partially schematic side elevation view of a passenger seating area having an off-angle display system configured in accordance with another embodiment of the invention.

FIG. 5 is a partially schematic side elevation view of a passenger seating area 500 having an off-angle display system 501 configured in accordance with another embodiment of the invention. In one aspect of this embodiment, the off-angle display system 501 includes a visual display device 510 carried by an armrest portion 506 of a passenger seat 502. The visual display device 510 can include a display screen 512 configured to display visual images for a passenger P. The display screen 512 at least generally faces a first direction D that is angled relative to a viewing direction VD of the passenger P. In another aspect of this embodiment, the off-angle display system 501 further includes an optical tilting device 520 at least generally overlaying the display screen 512. As described above with reference to FIG. 1, the optical tilting device 520 can optically tilt the visual images on the display screen 512 toward the viewing direction VD to improve the passenger's view of the images. In addition to the optical tilting device 520, the off-angle display system 501 can also include an image distorter 540 (shown schematically in FIG. 5) configured to electrically distort the images to compensate for the optical distortion caused by the angle of the display screen 512 relative to the passenger P.

Figure 6:
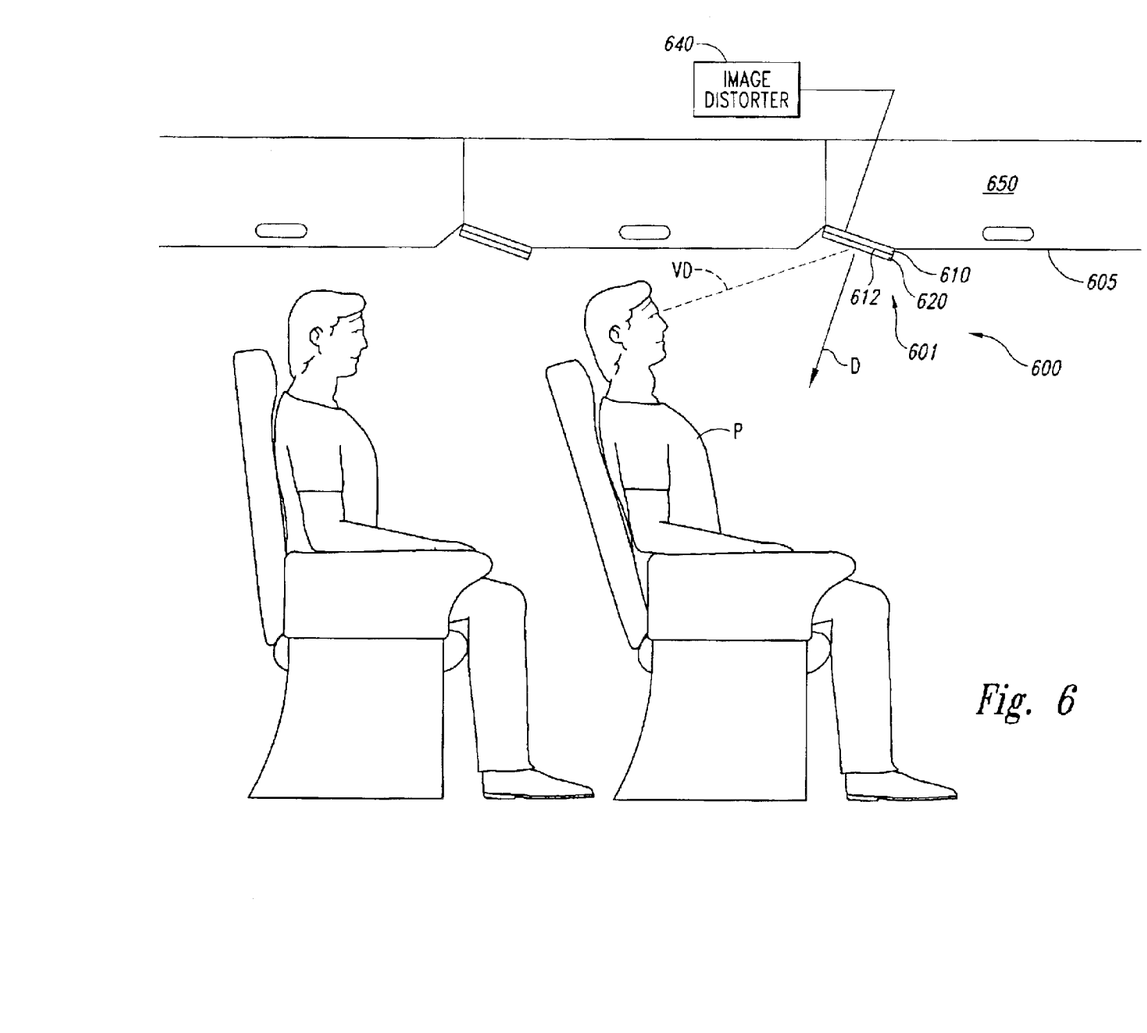
FIG. 6 is a partially schematic side elevation view of a passenger seating area having an off-angle display system configured in accordance with a further embodiment of the invention.

FIG. 6 is a partially schematic side elevation view of a passenger seating area 600 having an off-angle display system 601 configured in accordance with a further embodiment of the invention. In one aspect of this embodiment, the passenger seating area 600 includes an interior wall 605 extending fore and aft above a passenger P. In the illustrated embodiment, the interior wall 605 includes a bottom surface of an overhead structure 650. The overhead structure 650 can include an overhead surface such as a ceiling, a luggage bin, or other structure configured to accommodate passenger carry-on luggage. In another aspect of this embodiment, the off-angle display system 601 includes a visual display device 610 having a display screen 612 configured to display visual images for viewing by the passenger P. The visual display device 610 is carried in a recessed portion 606 of the overhead structure 650 adjacent to the interior wall 605. In this position, the display screen 612 at least generally faces a first direction D that is angled relative to a viewing direction VD of the passenger P. In another aspect of this embodiment, however, the off-angle display system 601 further includes an optical tilting device 620 at least generally overlaying the display screen 612 to optically tilt the visual images on the display screen 612 toward the viewing direction VD. In addition to the optical tilting device 620, the off-angle display system 601 can also include an image distorter 640 (shown schematically in FIG. 6). The image distorter 640 can be at least generally similar in structure and function to the image distorter 140 described above with reference to FIG. 1. Accordingly, the image distorter 640 can be configured to electronically distort the visual images on the display screen 612 to compensate for the optical distortion caused by the angle of the display screen 612 relative to the passenger P.

Figure 7:
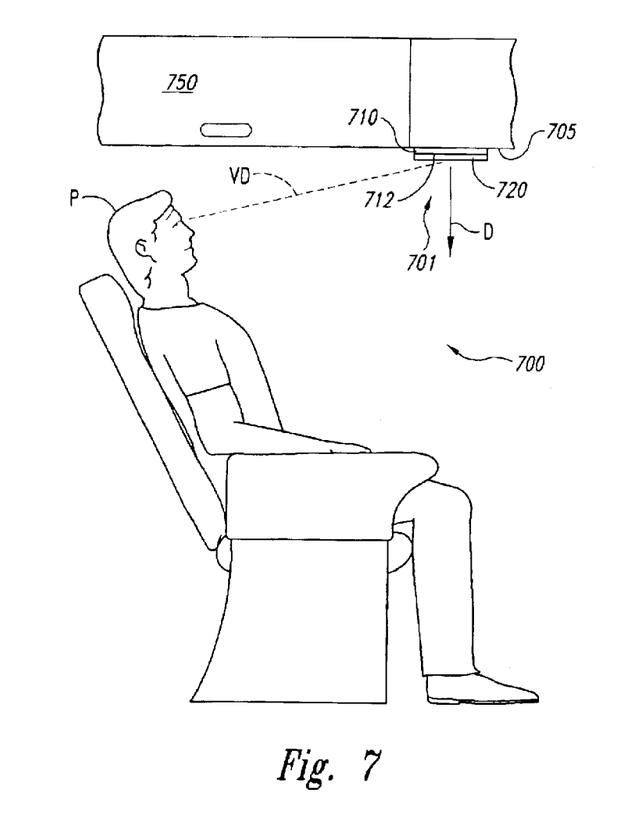
FIG. 7 is a partially schematic side elevation view of a passenger seating area having an off-angle display system configured in accordance with yet another embodiment of the invention.

FIG. 7 is a partially schematic side elevation view of a passenger seating area 700 having an off-angle display system 701 configured in accordance with yet another embodiment of the invention. In one aspect of this embodiment, the off-angle display system 701 includes a visual display device 710, a display screen 712, an optical tilting device 720, and an image distorter 740 that are at least generally similar in structure and function to the corresponding components of the off-angle display system 601 of FIG. 6. In another aspect of this embodiment, however, the visual display device 710 is carried at least approximately flush to a bottom surface 705 of an overhead structure 750. In this position, the display screen 712 faces at least generally downward in a first direction D that is severely angled relative to a viewing direction VD of a passenger P. Given the extreme angle between the first direction D and the viewing direction VD, the passenger P may elect to fully recline his or her seat to further facilitate viewing of visual images on the display screen 712.

Figure 8:
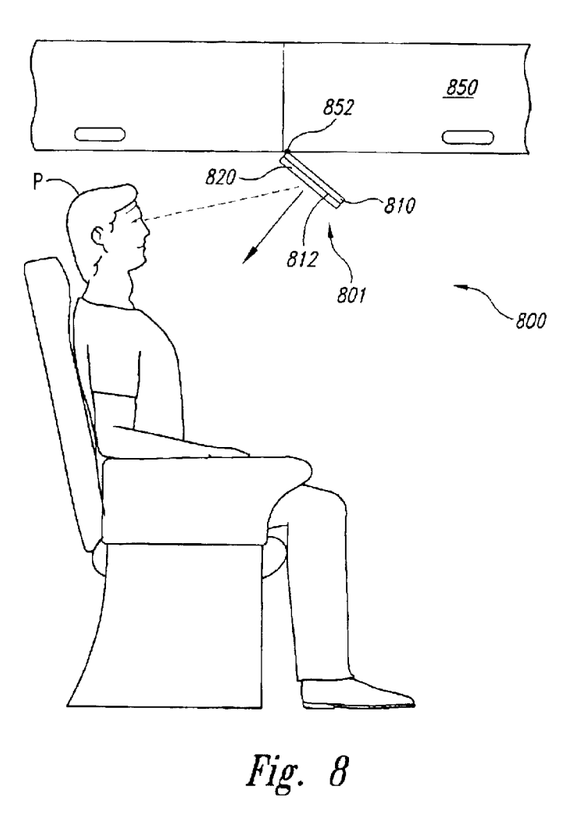
FIG. 8 is a partially schematic side elevation view of a passenger seating area having an off-angle display system configured in accordance with a further embodiment of the invention.

FIG. 8 is a partially schematic side elevation view of a passenger seating area 800 having an off-angle display system 801 configured in accordance with a further embodiment of the invention. In one aspect of this embodiment, the off-angle display system 801 can include a visual display device 810 having a display screen 812 configured to display visual images for a passenger P. The off-angle display system 801 can further include an optical tilting device 820 configured to optically tilt the displayed visual images to enhance their viewing by the passenger P. In another aspect of this embodiment, the visual display device 810 can be pivotally mounted to a bottom surface 805 of an overhead structure 850. In operation, passenger P can pivot the visual display device 810 downwardly about a hinge point 852 to further facilitate viewing of visual images on the display screen 812. During portions of the flight (e.g., during takeoff and landing) when the visual display device 810 could present a head strike concern if lowered, the passenger P can pivot the visual display device 810 upwardly to return to its stowed position against the overhead structure 850.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A seat for use in vehicles, the seat comprising:
    a seat portion; and
    an off-angle display system carried by the seat portion, the off-angle display system including:
        a visual display device having a display screen configured to display visual images, the display screen at least generally facing a first direction relative to the seat portion; and
        an optical tilting device at least generally overlaying the display screen, the optical tilting device configured to optically tilt the visual images on the display screen toward a second direction, the second direction being angled relative to the first direction.

2. The seat of claim 1 wherein the optical tilting device includes a refracting lens.

3. The seat of claim 1 wherein the off-angle display system is carried by a seatback portion of the seat, and wherein the off-angle display system further comprises an image distorter operatively connected to the visual display device, the image distorter configured to electronically distort the visual images on the display screen.

4. The seat of claim 1 wherein the off-angle display system is carried by a seatback portion of the seat, the seatback portion being movable between a first reclined position and a second reclined position, and wherein the off-angle display system further comprises an image distorter operatively connected to the visual display device, the image distorter configured to electronically distort the visual images on the display screen in response to movement of the seatback portion from the first reclined position to the second reclined position.

5. The seat of claim 1 wherein the off-angle display system is carried by a seatback portion of the seat, and wherein the off-angle display system further comprises an image distorter operatively connected to the visual display device, the image distorter configured to electronically distort the visual images on the display screen by at least vertically elongating the visual images.

6. The seat of claim 1 wherein the off-angle display system is carried by a seatback portion of the seat, and wherein the off-angle display system further comprises an image distorter operatively connected to the visual display device, the image distorter configured to electronically distort the visual images on the display screen by vertically elongating the visual images and horizontally compressing at least a portion of the visual images.

7. The seat of claim 1 wherein the display screen is at least generally fixed with respect to the seat portion.

8. The seat of claim 1 wherein the off-angle display system is carried by a seatback portion of the seat.

9. The seat of claim 1 wherein the off-angle display system is carried by an armrest portion of the seat.

10. The seat of claim 1 wherein the optical tilting device includes a Fresnel lens.

11. The seat of claim 1 wherein the optical tilting device includes a Fresnel prism.

12. The seat of claim 1 wherein the optical tilting device is a Fresnel lens configured to optically tilt the visual images at an angle from about 20 degrees to about 34 degrees relative to the first direction.

13. The seat of claim 1 wherein the visual display device includes a video display device.

14. The seat of claim 1 wherein the visual display device includes a liquid crystal display.

15. The seat of claim 1 wherein the visual display device includes a plasma display.

16. The seat of claim 1 wherein the off-angle display system is carried by a seatback portion of the seat, the seatback portion being movable between a first reclined position and a second reclined position, and wherein the off-angle display system further comprises:
    an image distorter operatively connected to the visual display device; and
    a distorter controller operatively connected to the image distorter, wherein the distorter controller is configured to output a signal to the image distorter causing the image distorter to electronically distort the visual images on the display screen in response to movement of the seatback portion from the first reclined position to the second reclined position.

17. An aircraft passenger cabin comprising:
    at least one passenger seat;
    at least one interior wall;
    at least one overhead structure; and
    an off-angle display system carried by at least one of the passenger seat, the interior wall, and the overhead structure, the off-angle display system including:

a visual display device having a display screen configured to display visual images, the display screen at least generally facing a first direction; and an optical tilting device at least generally overlaying the display screen, the optical tilting device configured to optically tilt the visual images on the display screen toward a second direction, the second direction being angled relative to the first direction.

18. The passenger cabin of claim 17 wherein the overhead structure includes a downward facing surface, and wherein the off-angle display system is positioned at proximate to the downward facing surface of the overhead structure.

19. The passenger cabin of claim 17 wherein the overhead structure includes a bottom surface facing at least generally downward, wherein the overhead structure further includes a recessed portion adjacent to the bottom surface, and wherein the off-angle display system is positioned at least generally in the recessed portion of the overhead structure.

20. The passenger cabin of claim 17 wherein the overhead structure includes a bottom surface facing at least generally downward, wherein the overhead structure further includes a recessed portion adjacent to the bottom surface, and wherein the off-angle display system is positioned at least generally in the recessed portion of the overhead structure at an angle with respect to the bottom surface.

21. The passenger cabin of claim 17 wherein the interior wall includes a side wall extending at least generally vertically adjacent to the passenger seat, and wherein the visual display device is carried by the side wall.

22. An aircraft passenger cabin comprising:

at least one passenger seat having a seatback portion, the seatback portion being movable between a first reclined position and a second reclined position; and an off-angle display system carried by the seatback portion of the passenger seat, the off-angle display system including:

a visual display device having a display screen configured to display visual images, the display screen at least generally facing a first direction;

an optical tilting device at least generally overlaying the display screen, the optical tilting device configured to optically tilt the visual images on the display screen toward a second direction, the second direction being angled relative to the first direction; and an image distorter operatively connected to the visual display device, the image distorter configured to electronically distort the visual images on the display screen in response to movement of the seatback portion from the first reclined position to the second reclined position.

23. The aircraft passenger cabin of claim 22, further comprising a distorter controller operatively connected to the image distorter, wherein the distorter controller is configured to output a signal to the image distorter causing the image distorter to electronically distort the visual images on the display screen in response to movement of the seatback portion from the first reclined position to the second reclined position.

24. An off-angle display system comprising:

a visual display device including a display screen configured to display visual images, the display screen at least generally facing a first direction; and an optical tilting device at least generally overlaying the display screen, the optical tilting device configured to optically tilt the visual images on the display screen toward a second direction, the second direction being angled relative to the first direction.

25. The off-angle display system of claim 24 wherein the optical tilting device includes a Fresnel lens.

26. The off-angle display system of claim 24 wherein the optical tilting device includes a Fresnel prism.

27. The off-angle display system of claim 24 wherein the optical tilting device includes a Fresnel lens configured to optically tilt the visual images at an angle from about 20 degrees to about 34 degrees relative to the first direction.

28. The off-angle display system of claim 24, further comprising an image distorter configured to electronically distort the visual images on the display screen.

29. The off-angle display system of claim 24 wherein the visual display device includes a video display device.

30. The off-angle display system of claim 24 wherein the visual display device includes a computer display device.

31. The off-angle display system of claim 24 wherein the visual display device includes a television display device.

32. A display system comprising:

a visual display device including a display screen configured to display visual images; and an image distorter operatively connected to the visual display device, wherein the visual images have a first length when the display screen is at least generally aligned with a vertical direction, and wherein the image distorter automatically electronically elongates the visual images to a second length when the display screen is inclined to the vertical direction.

33. The display system of claim 32 wherein the image distorter is configured to automatically distort the visual images in response to movement of the display screen from a first inclination to a second inclination.

34. A display system comprising:

a visual display device including a display screen configured to display visual images; and an image distorter operatively connected to the visual display device, the image distorter configured to automatically electronically distort the visual images in a first direction and a second direction in response to movement of the display screen from a first inclination to a second inclination, the first direction being at least generally perpendicular to the second direction.

35. A display system comprising:

a visual display device including a display screen configured to display visual images; and an image distorter operatively connected to the visual display device, wherein the visual images have a first length when the display screen is positioned at a first inclination, and wherein the image distorter automatically electronically elongates the visual images from the first length to a second length when the display screen is moved from the first inclination to a second inclination, the second inclination being less than the first inclination.

36. A display system comprising:

a visual display device including a display screen configured to display visual images; and an image distorter operatively connected to the visual display device, wherein the visual images have a first width when the display screen is at least generally aligned with the vertical direction, and wherein the image distorter automatically electronically compresses at least a portion of the visual images to a second width when the display screen is inclined to the vertical direction.

37. The display system of claim 32 wherein the image distorter automatically keystones the visual images in response to a change in angular position of the display screen.

38. The display system of claim 32 wherein the visual display device is configured to be carried by a structure, and wherein the image distorter automatically distorts the visual images on the display screen in response to movement of the structure from a first position to a second position.

39. The display system of claim 32, further comprising an inclinometer configured to output a signal to the image distorter in response to changes in inclination of the display screen, wherein the image distorter is further configured to distort the visual images on the display screen in response to receiving the signal from the inclinometer.

40. A method of manufacturing a display system, the method comprising:
providing a visual display device including a display screen configured to display visual images, the display screen at least generally facing a first direction; and
overlaying the display screen with an optical tilting device, the optical tilting device configured to optically tilt the visual images on the display screen toward a second direction, the second direction being angled relative to the first direction.

41. The method of claim 40, further comprising mounting at least the display screen to a portion of a passenger seating area in a vehicle.

42. The method of claim 40, further comprising mounting at least the display screen to a seat portion of a passenger seating area in a vehicle.

43. The method of claim 40, further comprising operatively connecting an image distorter to the visual display device, the image distorter being configured to electronically distort the visual images on the display screen.

44. A method of providing visual images to a passenger in a vehicle, the method comprising:
displaying visual images on a display screen, the display screen being carried by a seat portion and at least generally facing a first direction, the display screen being visible to the passenger from a second direction, the second direction being at an angle to the first direction; and
directing the visual images through an optical tilting device to optically tilt the visual images toward the second direction to facilitate viewing by the passenger.

45. The method of claim 44 wherein displaying visual images on a display screen includes displaying video recorded content on the display screen.

46. The method of claim 44, further comprising electronically distorting the visual images on the display screen.

47. The method of claim 44, further comprising electronically distorting the visual images on the display screen to compensate for optical distortion caused by the angular difference between the first direction and the second direction.

48. A method of providing off-angle visual images to a viewer, the method comprising:
displaying visual images on a display screen at least generally facing a first direction, the display screen being visible to the viewer from a second direction, the second direction being at an angle to the first direction; and
optically tilting the visual images away from the first direction toward the second direction to facilitate viewing of the visual images by the viewer.

49. The method of claim 48 wherein displaying visual images on a display screen includes displaying video content on a display screen.

50. The method of claim 48, further comprising electronically distorting the visual images on the display screen by at least one of elongating or compressing portions of the visual images.

51. A system for providing visual images to a viewer, the system comprising:
support means for carrying a display screen at least generally facing a first direction, the display screen being visible to the viewer from a second direction, the second direction being at an angle to the first direction;
display means for displaying visual images on the display screen; and
refracting means for optically tilting the visual images on the display screen away from the first direction toward the second direction to facilitate viewing of the visual images by the viewer.

52. The system of claim 51 wherein the support means includes seating means configured to accommodate a passenger in a vehicle.

53. The system of claim 51, further comprising distorting means for electronically distorting the visual images displayed on the display screen.

54. The system of claim 51, further comprising automatic distorting means for automatically electronically distorting the visual images displayed on the display screen.

55. The system of claim 51, further comprising:
distorting means for electronically distorting the visual images displayed on the display screen; and
adjustment means at least generally accessible to the viewer, the adjustment means allowing the user to manually control the distorting means to facilitate viewing of the visual images by the viewer.

* * * * *